United States Patent [19]

Solbjörg

[11] Patent Number: 5,827,441
[45] Date of Patent: Oct. 27, 1998

[54] CASTING MOULD ARRANGEMENT FOR THE EMBEDDING OF PIPES

[75] Inventor: Öistein Solbjörg, Oslo, Norway

[73] Assignee: Oslo Presstoff Industri A/S, Oslo, Norway

[21] Appl. No.: 769,438

[22] Filed: Dec. 19, 1996

Related U.S. Application Data

[63] Continuation of PCT/IB94/00120, Jun. 16, 1994 published as WO95/34728, Dec. 21, 1995.

[51] Int. Cl.[6] .............................. E04G 13/00; F16L 3/22
[52] U.S. Cl. .............................. 249/91; 249/85; 248/68.1
[58] Field of Search .................... 249/10, 83, 85, 249/91, 90; 52/677, 687; 248/68.1, 69

[56] References Cited

U.S. PATENT DOCUMENTS

| | | | |
|---|---|---|---|
| 2,099,260 | 11/1937 | Colt | 249/91 |
| 3,464,661 | 9/1969 | Alesi, Jr. | 248/68 |
| 3,530,634 | 9/1970 | Adams | 52/687 |
| 3,856,246 | 12/1974 | Sinko | 248/68 |
| 4,085,559 | 4/1978 | Ilukowicz | 52/687 |
| 4,159,605 | 7/1979 | Ilukowicz | 249/91 |
| 4,496,264 | 1/1985 | Casey | 52/677 |
| 4,575,985 | 3/1986 | Eckenrodt | 52/677 |

FOREIGN PATENT DOCUMENTS

| | | |
|---|---|---|
| 163635 | 3/1990 | Norway . |
| 9301694 | 11/1994 | Sweden . |

*Primary Examiner*—James P. Mackey
*Attorney, Agent, or Firm*—IP Group of Pillsbury Madison & Sutro LLP

[57] ABSTRACT

A casting mould arrangement for the embedding of pipes, in which the individual pipes are assumed to be placed substantially at a predetermined distance from one another and which includes at least two base parts and at least one intermediate part. These parts are provided with recesses intended to hold the pipes securely and to fix the pipes in position, sockets which have a holder arm and are arranged at each end of the base part in order to securely hold the mould panels which are located on the sides of the casting mould and which delimit the casting mould laterally, and holes for receiving reinforcement bars. The holes include pockets in which reinforcement bars are intended to be placed and retained substantially at a predetermined distance from the bottom top and side covering of the casting mould. A base part is included in the arrangement.

12 Claims, 3 Drawing Sheets

Fig. 1a (PRIOR ART)
Fig. 1b (PRIOR ART)
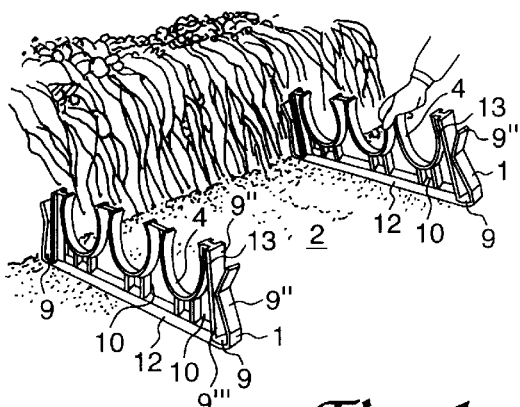
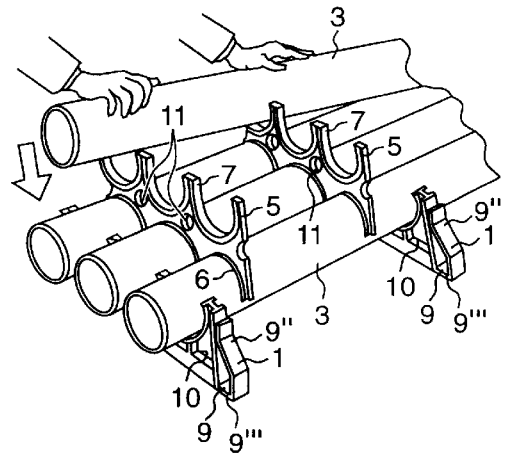
Fig. 1c (PRIOR ART)
Fig. 1d (PRIOR ART)
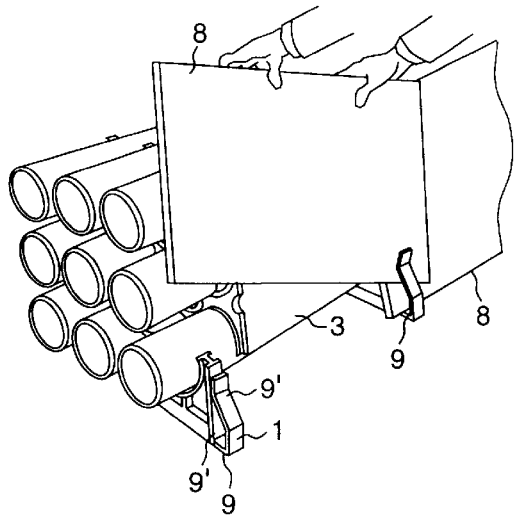
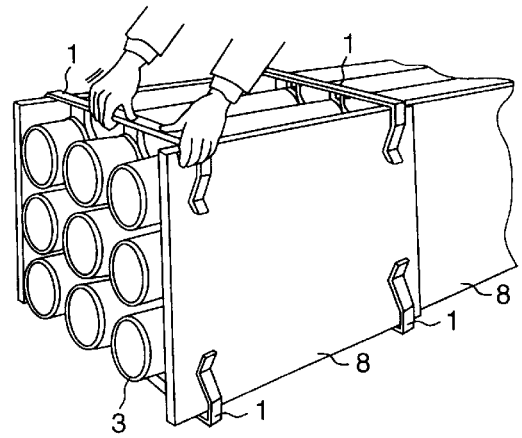
Fig. 2
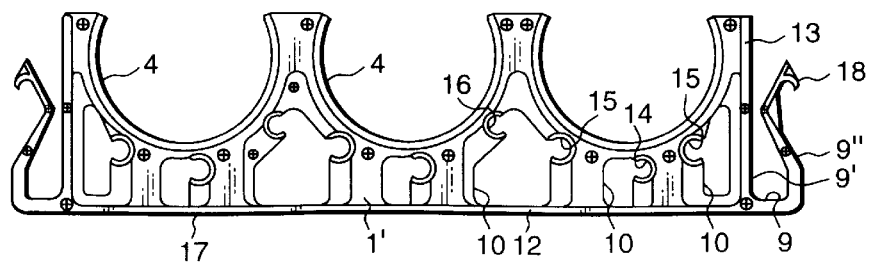

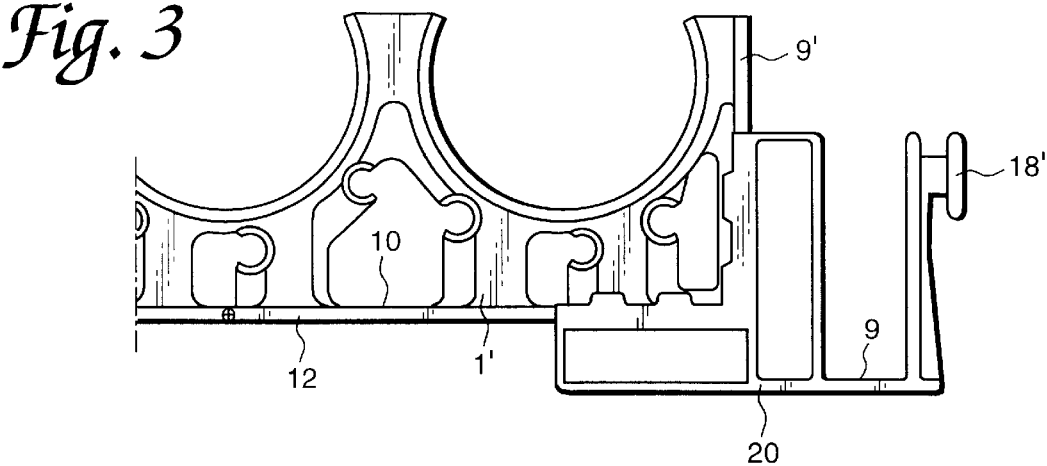
Fig. 3
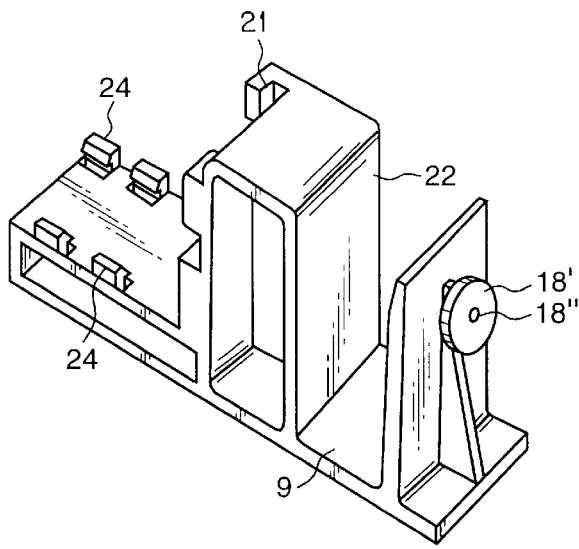
Fig. 4
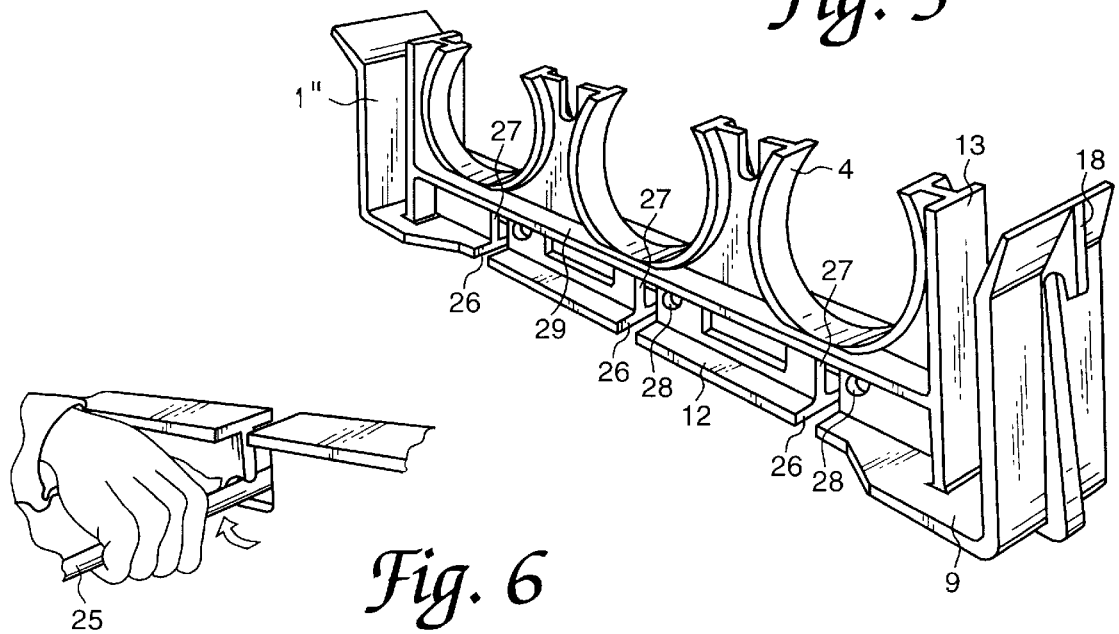
Fig. 5
Fig. 6

5,827,441

CASTING MOULD ARRANGEMENT FOR THE EMBEDDING OF PIPES

REFERENCE TO RELATED APPLICATION

The is a continuation of PCT International Application No. PCT/IB94/00120, filed Jun. 16, 1994, published as WO95/34728, Dec. 21, 1995 designating the U.S.

BACKGROUND OF THE INVENTION

The present invention relates to a casting mould arrangement for the embedding of pipes, in which the individual pipes are assumed to be placed essentially at a predetermined distance from one another and which comprises at least two base parts and at least one intermediate part, which parts are provided with recesses intended to hold the pipes securely and to fix the pipes in position, sockets which have a holder arm and are arranged at each end of the base part in order to hold securely mould panels which are located on the sides of the casting mould and which delimit the casting mould laterally, and means for receiving reinforcement bars. The invention also relates to the base part included in the arrangement.

Such an arrangement, which is known from Norwegian Patent 163635, is intended to support the pipes and the mould panels at a predetermined distance from one another for the purposes of casting. When the frame forming the mould is set up and, if appropriate, reinforcement bars have been placed in the mould, concrete is poured into the mould in order to obtain a stable, protected and continuously extending pipe assembly. The problems which arise in the case of this arrangement are, on the one hand, that the reinforcement bars cannot be placed at defined distances from the top, bottom and/or sides of the casting mould, and, on the other hand, that the casting mould cannot be held together when the concrete is poured into the latter, due to the fact that the displaced concrete presses the pipes upwards and that the concrete presses against the mould panels.

A known further development of this known arrangement is shown in FIGS. 1a–d, in which it can be seen how a frame has been set up for embedding of the pipe assembly, the pipe assembly in this case consisting of nine pipes. As can be seen from these figures, the sockets included in the arrangement have continuous and closed recesses through which reinforcement bars are passed prior to casting. Since the pipe assembly often follows a path which is not completely straight, it is impossible to place the reinforcement bars precisely at the intended position.

SUMMARY OF THE INVENTION

An object of the present invention is to produce an arrangement and a base part included therein of the type mentioned in the preceding background section, in which, by eliminating the disadvantages, described above, of the known arrangements, an arrangement and a base part included therein are produced in which the precise mutual positioning of the pipes and of the reinforcement bars in predetermined positions in the casting mould is facilitated, and, consequently, the parts included in the casting mould are held together well during casting.

By means of the arrangement and of the base part included therein according to the invention, the reinforcement bars can be put into place by a simple manoeuvre, during the actual setting-up of the pipe assembly in the frame forming the mould, with the aid of the recesses which are arranged on the sockets and which have pockets into which the reinforcement bars are intended to be snapped tight.

BRIEF DESCRIPTION OF THE DRAWINGS

The invention is described in greater detail hereinbelow with reference to the attached drawings which show preferred embodiments of the arrangement and of the base part included therein according to the invention.

FIGS. 1a–1d show the method for assembling a conventional arrangement.

FIG. 2 shows a front view of a first embodiment of a base part according to the invention.

FIG. 3 shows a partial front view of a second embodiment of a base part according to the invention.

FIG. 4 shows a perspective view of a separate part intended to be connected to a socket included in the base part according to FIG. 3.

FIG. 5 is a perspective view of a third embodiment of a base part according to the invention, in which pockets for three reinforcement bars have been positioned and designed in a manner different from that in the embodiments according to FIGS. 2–4.

FIG. 6 shows a detailed perspective view of the fitting of reinforcement bars in recesses provided in the embodiment according to FIG. 5.

DETAILED DESCRIPTION

Figure 7:
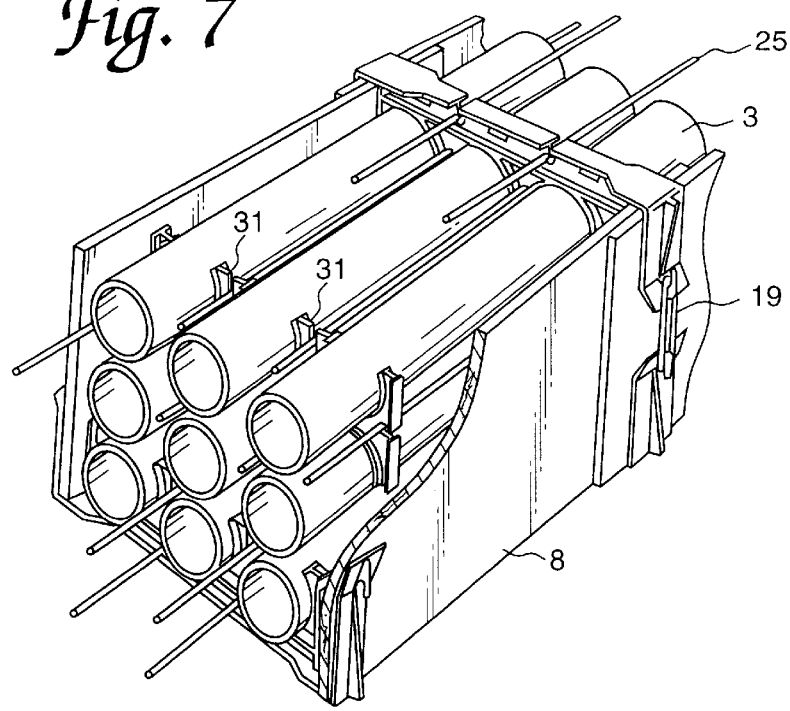
FIG. 7 shows a modified variant of the third embodiment of the base part according to FIG. 5 in a partially assembled state with room for two reinforcement bars along the longitudinal rib.
Figure 8:
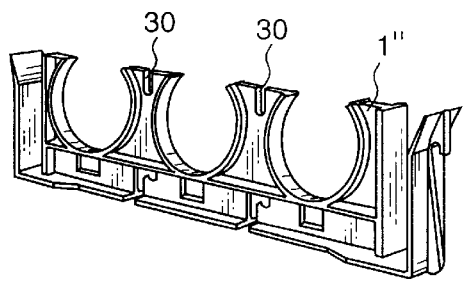
FIG. 8 shows a perspective view of the parts included in a base part in the embodiment according to FIG. 7.
Figure 9:
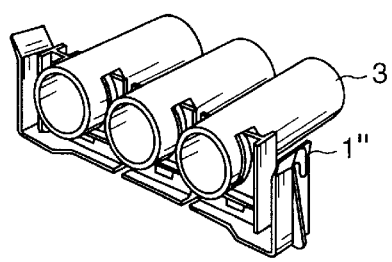
FIG. 9 shows a perspective view of the base part in FIG. 8 with pipes mounted therein.
Figure 10:
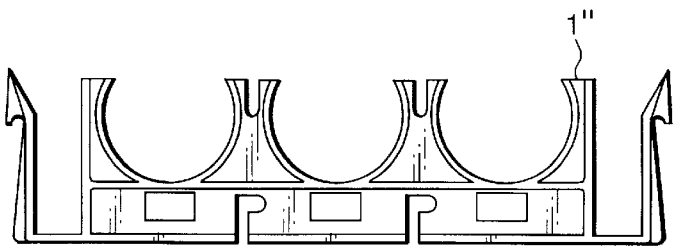
FIG. 10 shows a plan view of the base part in FIGS. 7 and 8.

FIGS. 1a–1d show the assembling of a casting mould in accordance with the previously known technique. Concrete is to be poured into the casting mould in order thereby to form a pipe assembly, preferably for cables. As can be seen from FIG. 1a, base parts 1 included in the casting mould and preferably made of plastic material are first placed at a distance from one another on the ground which has already been levelled, most often on the bottom 2 of a pit or a trench. A first row of pipes 3 is then snapped into place in recesses 4 provided for this purpose in the base parts 1, after which intermediate parts 5, preferably made of plastic material and having pipereceiving recesses 6 and 7 arranged, respectively, on the underside and upper side, are placed at a distance from one another and from the base parts 1, as can be seen from FIG. 1b, and are snapped securely onto the pipes 3 in the first row already mounted on the base parts 1. The next row of pipes 3 and further intermediate parts 5 are then put into place in the same way, and, following the third and uppermost row of pipes 3, mould panels 8 are fitted in sockets 9 arranged at the outer ends of the base parts 1, as can be seen from FIG. 1c. Finally, base parts 1 are once again applied, although inverted, so that the pipes in the uppermost row snap into the recesses 4 and so that the mould panels 8 are received in the sockets 9, as can be seen from FIG. 1d. The casting mould is now ready, and after reinforcement bars (not shown in FIGS. 1a–d) have been placed, as required, in holes 10 formed on the base part or in holes 11 formed on the intermediate part, concrete can be poured into the mould so that an embedded pipe assembly for cables is obtained. For stiffening the base part, the base part has a longitudinal rib 12 and, arranged at right angles to the latter at the outer ends of the base part, side ribs 13 which are connected to the longitudinal rib. Each socket 9 is delimited by the outer surface 9' of the side rib and by a holder arm 9''' which is connected to the outer ends of the base part, is preferably inwardly sprung and is arranged such that the lower end of the arm 9''' is connected integrally to a part 9'''' which extends from the base part essentially as an extension of the longitudinal rib 12. In the previously known embodiment, the distances between the pipes and between pipes and mould panels are assumed to be at least 30 mm in order to make it possible, inter alia, to provide room for vibration rods to be pushed down into the concrete between the pipes and between the pipes and the mould panels in the casting mould. It should be possible to dispense completely with the use of vibration rods if the casting mould is held together better and if the concrete has the right consistency (flowability).

In the figures discussed hereinbelow, similar components have been designated by the same reference characters. However, the respective parts can differ somewhat in form, which does not in any way limit the invention.

FIG. 2 shows certain improvements which have been brought about according to the invention in respect of the base part 1' included in a casting mould arrangement. Pockets 14, 15 and 16 connected to the holes 10 have been made in the base part 1', the pockets 14 being arranged approximately 25 mm from the outer surface 17 of the longitudinal rib 12, the pockets 15 being arranged approximately 35 mm from the outer surface 17 of the longitudinal rib 12, and the pockets 16 being arranged approximately 50 mm from the outer surface 17 of the longitudinal rib 12. These positions of the pockets are based on the standards which are prescribed for the positioning of reinforcement bars in a concrete mould of this type. The measurements mentioned above are therefore only given as practical examples and can of course be varied both in terms of their number and in terms of their mutual positioning shown on the base part. The pockets are shaped in such a way that the width of their opening towards the holes 10 is slightly smaller than the diameter of a conventional reinforcement bar, so that each reinforcement bar can be pushed into position by a snap action, as is shown in FIG. 6, and can also to a certain extent, depending on the size and position of the entrance opening of the pocket, be held in the latter when it has been positioned therein. The free end of the holder arm 9''' of the socket 9 has a bent portion, which forms a hook-shaped part 18. The hook-shaped parts 18 of two base parts mounted opposite each other on the underside and top side, respectively, of the casting mould are, as is shown in conjunction with the embodiment in FIG. 7, secured to each other by means of a connection member 19, which preferably consists of a relatively stiff rubber ring, which, when the concrete is poured into the casting mould, prevents the upper base parts from bouncing out of their positions and the casting mould thereby falling apart. The connection member 19 can also consist of a cord, preferably made of metal, or the like, which is wound round the hooks and which holds the base parts securely in place when they have been fitted on the casting mould. The sockets 9 are designed in such a way that they are able to receive at least one mould panel. Because the holder arm 9''' is sprung towards the side rib 13 it is possible to introduce two mould panels at the same time into each socket since, at the joint between two mould panels, these latter are usually placed overlapping in the sockets (see FIGS. 1c and d). The sockets can also be wider in order to allow the edges of two adjoining mould panels to be placed edge to edge in the socket.

FIGS. 3 and 4 show another embodiment of the arrangement according to the invention with a base part 1' without sockets at the ends. These sockets have been removed either during or after the production of the base is part 1'. Instead of the socket according to the embodiment in FIG. 2, this embodiment comprises separate socket parts 20 with knob-shaped parts 18' arranged at the free ends of the holder arms. These knob-shaped parts 18' have, in principle, the same function as the hook-shaped parts 18 described above, but they are better suited for the application of a cord which can be secured by being wound round the knob or being knotted firmly on the latter. A hole 18'' can be formed through the knob 18', through which hole a securing member, such as a nail, a screw or the like, can be driven or screwed in for the purpose of securing the mould panels in place. This hole can also be arranged at another point on the holder arm 9'''. Each socket part arranged on either side of the base part has a groove 21 which is arranged along a portion 22 extending essentially parallel to the socket and into which a corresponding side rib 13 on the base part is intended to be introduced, after which catches 24 arranged on a protruding portion 23 are snapped firmly onto the edges of the longitudinal rib 12. In this embodiment of the arrangement, the longitudinal rib 12 is provided on each side edge with recesses (not shown) in order to allow the enclosing edges of the groove 21 to be guided past the longitudinal rib and onto the side ribs. By means of this embodiment of the arrangement, it is possible, as a result of the design of the socket part 20, to adapt the distance of the reinforcement bars with respect to the side, top and bottom coverings such that this distance is essentially identical over the whole casting mould. The dimensions of the socket part 20 which is used are thus dependent on which pocket 14, 15 or 16 is chosen for the reinforcement bars.

In a further development of the arrangement according to the invention, which is shown in FIGS. 5–10, the base part 1'' does not have holes, as in the embodiments described above, for receiving reinforcement bars 25, but instead is provided with an opening 26 in a lateral direction through the longitudinal rib 12, which opening 26 leads via a groove 27 to a pocket 28, i.e. the reinforcement bars do not have to be passed through any hole, but instead can be introduced into each pocket from the side. FIG. 5 shows an embodiment with three pockets along the longitudinal rib, and FIGS. 7–10 show an embodiment with two pockets. Because the longitudinal rib in these embodiments is interrupted, as emerges clearly from FIG. 10, an additional longitudinal rib 29 has been arranged parallel to the original longitudinal rib 12. Smaller and preferably long and narrow recesses 30 are provided on the base part between the recesses for the pipes. These smaller recesses are also intended to receive reinforcement bars, these reinforcement parts being introduced into the smaller recesses after the first row of pipes has been placed on the base parts during the assembly, after which intermediate parts with smaller recesses 31 arranged at corresponding points are put into place so that the reinforcement bars are held in the continuous channel which is formed by the recesses 30 and 31. In the embodiments shown and described earlier, it has been necessary, as mentioned hereinabove, to pass the reinforcement bars through the holes in the base and intermediate parts. The positioning of the reinforcement bars is considerably facilitated in the embodiments according to FIGS. 5–10, it being possible for this to be done at the same time as the pipes are fitted in place in the casting mould. The reinforcement bars, which in most cases are very long, do not therefore have to be passed through any hole in the already fitted base and/or intermediate parts in order to be brought into position.

A notch or a narrowing of the thickness can be provided at the point where the holder arm 9" connects to the side rib 13 on the base part so that, preferably when the casting mould has hardened somewhat, the holder arms can be easily broken off or cut off and the mould panels 8 can be removed from the casting mould for re-use. However, the notch or the thickness of the holder arm 9" at the point of connection to the side rib 13 must be adapted such that the holder arm can withstand the pressure against the panel 8 which arises during casting.

The base parts described above have been described in relation to different numbers of pipes. Within the scope of the invention it is possible for a composite base part to be produced for each desired number of pipes, a suitable number of pipes side by side in one row in an individual base part being one, two or three.

The arrangement and the base part according to the invention, which have been described above with reference to the drawings, are not limited to the preferred embodiments, and instead these can of course be mutually modified by means of the features contained therein being combined with one another within the scope of the attached patent claims.

I claim:

1. A casting mould for the embedding of a plurality of individual pipes at a predetermined distance from one another, together with a plurality of reinforcing bars, all extending longitudinally, in a body of cast material cast around the pipes and reinforcing bars in the casting mould, said casting mould comprising:

a lower base part, an upper base part, and at least one intermediate part;

said lower base part having a plurality of transversely spaced, upwardly opening recesses arranged to hold a respective number of pipes securely and fix those pipes in position;

said upper base part having a plurality of transversely spaced, downwardly opening recesses arranged to hold a respective number of pipes securely and fix those pipes in position;

each said intermediate part including a first plurality of transversely spaced, upwardly opening recesses arranged to hold a respective number of pipes securely and fix those pipes in position, and a second plurality of transversely spaced, downwardly opening recesses arranged to hold a respective number of pipes securely and fix those pipes in position;

said lower base part, at least one intermediate part and upper base part being arranged to be stacked with respective pipes secured and fixed in position thereby, as a stack, in which some of the pipes are cooperatively secured between and fixed in position by said lower base part and a respective said intermediate part, and others of said pipes are cooperatively secured between and fixed in position by said upper base part and a respective said intermediate part;

said lower base part, at each of two transversely opposite ends thereof having a respective upwardly projecting arm providing a respective upwardly opening socket arranged to receive a corresponding lower edge margin of a respective mould side panel for laterally delimiting said casting mould;

said upper base part, at each of two transversely opposite ends thereof having a respective downwardly projecting arm providing a respectively downwardly opening socket arranged to receive a corresponding upper edge margin of a respective mould side panel for laterally delimiting said casting mould; and each of said parts including a plurality of openings extending longitudinally therethrough, and arranged for receiving and supporting in position respective longitudinally extending reinforcing bars of a given gauge;

at least one of said openings in each of said lower base and upper base parts having a hole portion which is contiguous with at least one pocket portion, of which the hole portion is sized to permit a reinforcing bar having said given gauge to be moved longitudinally, transversely and laterally therein, and the pocket portion is sized to transversely, laterally snappingly receive from the respective hole portion, hold securely and fix in position a respective reinforcing bar having said given gauge.

2. The casting mould of claim 1 wherein:

at least one said hole portion is contiguous with an edge of the respective said part, so that a reinforcing bar can be introduced transversely into the respective said opening.

3. The casting mould of claim 1, wherein:

at least one said hold portion is completely perimetrically bounded by material of the respective said part, so that a reinforcing bar must be introduced longitudinally into the respective said opening.

4. A casting mould for the embedding of a plurality of individual pipes at a predetermined distance from one another, together with a plurality of reinforcing bars, all extending longitudinally, in a body of cast material cast around the pipes and reinforcing bars in the casting mould, said casting mould comprising:

a lower base part, an upper base part, and at least one intermediate part;

said lower base part having a plurality of transversely spaced, upwardly opening recesses arranged to hold a respective number of pipes securely and fix those pipes in position;

said upper base part having a plurality of transversely spaced, downwardly opening recesses arranged to hold a respective number of pipes securely and fix those pipes in position:

each said intermediate part including a first plurality of transversely spaced, upwardly opening recesses arranged to hold a respective number of pipes securely and fix those pipes in position, and a second plurality of transversely spaced, downwardly opening recesses arranged to hold a respective number of pipes securely and fix those pipes in position;

said lower base part, at least one intermediate part and upper base part being arranged to be stacked with respective pipes secured and fixed in position thereby, as a stack, in which some of the pipes are cooperatively secured between and fixed in position by said lower base part and a respective said intermediate part, and others of said pipes are cooperatively secured between and fixed in position by said upper base part and a respective said intermediate part;

said lower base part, at each of two transversely opposite ends thereof having a respective upwardly projecting arm providing a respective upwardly opening socket arranged to receive a corresponding lower edge margin of a respective mould side panel for laterally delimiting said casting mould;

said upper base part, at each of two transversely opposite ends thereof having a respective downwardly projecting arm providing a respectively downwardly opening socket arranged to receive a corresponding upper edge margin of a respective mould side panel for laterally delimiting said casting mould; and each of said parts including a plurality of openings extending longitudinally therethrough, and arranged for receiving and supporting in position respective longitudinally extending reinforcing bars of a given gauge;

each of said arms having a connector hooking feature formed thereon and arranged such that two respective said connector hooking features on each side of said casting mold can be connected together by a respective connector hooked to them while stretched in tension, for holding said stack together during casting and setting of the cast material.

5. The casting mould of claim 4, wherein:

each of said arms is integrally formed with the respective said base part and forms an outer limit of a respective said socket.

6. The casting mould of claim 5, further comprising:

a hole formed transversely through each said arm and arranged for installation therethrough of a fastener for securing a respective edge margin of a respective mould side panel to the respective said base part.

7. A base part for a casting mould for the embedding of a plurality of individual pipes at a predetermined distance from one another, together with a plurality of reinforcing bars, all extending longitudinally, in a body of cast material cast around the pipes and reinforcing bars in the casting mould, said base part comprising:

a body having a plurality of transversely spaced, vertically opening recesses arranged to hold a respective number of pipes securely and fix those pipes in position;

said body being arranged to be stacked with other parts and with respective pipes secured and fixed in position thereby, as a stack, in which some of the pipes are cooperatively secured and fixed in position in part by said base part;

said base part, at each of two transversely opposite ends thereof having a respective laterally and vertically projecting arm providing a respectively vertically opening socket arranged to receive a corresponding edge margin of a respective mould side panel for laterally delimiting said casting mould; and said base part including a plurality of openings extending longitudinally therethrough, and arranged for receiving and supporting in position respective longitudinally extending reinforcing bars of a given gauge;

at least one of said openings having a hole portion which is contiguous with at least one pocket portion, of which the hole portion is sized to permit a reinforcing bar having said given gauge to be moved longitudinally, transversely and laterally therein, and the pocket portion is sized to transversely, laterally snappingly receive from the respective said hole portion, hold securely and fix in position a respective reinforcing bar having said given gauge.

8. The base part of claim 7, wherein:

at least one said hole portion is contiguous with an edge of said body, so that a reinforcing bar can be introduced transversely into the respective said opening.

9. The base part of claim 7, wherein:

at least one said hole portion is completely perimetrically bounded by material of said body, so that a reinforcing bar must be introduced longitudinally into the respective said opening.

10. A base part for a casting mould for the embedding of a plurality of individual pipes at a predetermined distance from one another, together with a plurality of reinforcing bars, all extending longitudinally, in a body of cast material cast around the pipes and reinforcing bars in the casting mould, said base part comprising:

a body having a plurality of transversely spaced, vertically opening recesses arranged to hold a respective number of pipes securely and fix those pipes in position;

said body being arranged to be stacked with other parts and with respective pipes secured and fixed in position thereby, as a stack, in which some of the pipes are cooperatively secured and fixed in position in part by said base part;

said base part, at each of two transversely opposite ends thereof having a respective laterally and vertically projecting arm providing a respectively vertically opening socket arranged to receive a corresponding edge margin of a respective mould side panel for laterally delimiting said casting mould; and said base part including a plurality of openings extending longitudinally therethrough, and arranged for receiving and supporting in position respective longitudinally extending reinforcing bars of a given gauge;

at least one of said openings having a hole portion which is contiguous with at least one pocket portion, of which the hole portion is sized to permit a reinforcing bar having said given gauge to be moved longitudinally, transversely and laterally therein, and the pocket portion is sized to transversely, laterally snappingly receive from the respective said hole portion, hold securely and fix in position a respective reinforcing bar having said given gauge;

each of said arms having a connector hooking feature formed thereon and arranged to have a respective connector hooked thereto while stretched in tension, for aiding in holding said stack together during casting and setting of the cast material.

11. The base part of claim 10, wherein:

each of said arms is integrally formed with said body and forms an outer limit of a respective said socket.

12. The base part of claim 11, further comprising:

a hole formed transversely through each said arm and arranged for installation therethrough of a fastener for securing a respective edge margin of a respective mould side panel to said base part.

* * * * *